(12) United States Patent
Haruta et al.

(10) Patent No.: US 9,017,782 B2
(45) Date of Patent: Apr. 28, 2015

(54) HEAT-SHRINKABLE POLYESTER FILM AND PACKAGES

(71) Applicant: Toyobo Co., Ltd., Osaka-shi, Osaka (JP)

(72) Inventors: Masayuki Haruta, Tsuruga (JP); Yukinobu Mukoyama, Tsuruga (JP)

(73) Assignee: Toyobo Co., Ltd., Osaka (JP)

( * ) Notice: Subject to any disclaimer, the term of this patent is extended or adjusted under 35 U.S.C. 154(b) by 0 days.

(21) Appl. No.: 14/372,641

(22) PCT Filed: Jul. 23, 2013

(86) PCT No.: PCT/JP2013/069908
§ 371 (c)(1),
(2) Date: Jul. 16, 2014

(87) PCT Pub. No.: WO2014/017483
PCT Pub. Date: Jan. 30, 2014

(65) Prior Publication Data
US 2015/0014202 A1 Jan. 15, 2015

(30) Foreign Application Priority Data
Jul. 26, 2012 (JP) .................................. 2012-166345

(51) Int. Cl.
*B65D 53/06* (2006.01)
*C08J 5/18* (2006.01)
(Continued)

(52) U.S. Cl.
CPC . *B65D 53/06* (2013.01); *C08J 5/18* (2013.01); *C08J 2367/02* (2013.01);
(Continued)

(58) Field of Classification Search
None
See application file for complete search history.

(56) References Cited

U.S. PATENT DOCUMENTS 4,529,645 A * 7/1985 Berg et al. .................. 428/298.7
2008/0182053 A1* 7/2008 Broadus et al. ............. 428/34.9
(Continued)

FOREIGN PATENT DOCUMENTS

JP 2009-143607 A 7/2009
JP 2011-252129 A 12/2011
(Continued)

OTHER PUBLICATIONS

Hummel et al., "Atlas of Polymer and Plastic Analysis" (published by VCH), Chapter 6 (Description of the substance classes and their *IR* spectra: Defined natural and synthetic polymers), pp. 370-371 (1991).
(Continued)

*Primary Examiner* — Vivian Chen
(74) *Attorney, Agent, or Firm* — Leydig, Voit & Mayer, Ltd.

(57) ABSTRACT

Provided is a heat-shrinkable polyester-based film having: a slow shrinkage speed; a shrinkage rate that increases gently with the increase of temperature; a large shrinkage stress; and an excellent shrinkage finish. This heat-shrinkable polyester-based film is characterized in that: the ratio (A1/A2) between the absorbancy (A1) at 1340 $cm^{-1}$ of the heat-shrinkable polyester-based film measured by the polarized ATR-FTIR method and the absorbancy (A2) at 1410 $cm^{-1}$ is from 0.65 to 0.9 in the main shrinkage direction of the film and from 0.45 to 0.75 in the direction orthogonal to the main shrinkage direction; and the warm-water heat shrinkage rate for when the film is immersed in 90-degree warm water for 10 seconds is from 40% to 60% in the main shrinkage direction of the film and from 0% to 12% in the direction orthogonal to the main shrinkage direction.

20 Claims, 2 Drawing Sheets

(51) Int. Cl.
　　　B65D 77/20　　(2006.01)
　　　B65D 75/00　　(2006.01)
　　　C08G 63/00　　(2006.01)
　　　B32B 27/36　　(2006.01)

(52) U.S. Cl.
　　　CPC ........ C08J 2467/02 (2013.01); B65D 77/2036 (2013.01); B32B 2307/582 (2013.01); B65D 75/002 (2013.01); B32B 2307/736 (2013.01); B32B 2307/54 (2013.01); C08G 63/00 (2013.01); B32B 27/36 (2013.01); C08G 2261/62 (2013.01); B29K 2995/0049 (2013.01)

(56) References Cited

U.S. PATENT DOCUMENTS

2012/0043248 A1　2/2012　Haruta et al.
2013/0008821 A1　1/2013　Haruta et al.

FOREIGN PATENT DOCUMENTS

WO　2010/137240 A1　12/2010
WO　2011/114934 A1　9/2011

OTHER PUBLICATIONS

Uenomachi et al., "Control of Shrinkage Property of Heat-Shrinkable Polyester Film," *Seikeikakou*, 6(10): 679-682 (1994).
Japanese Patent Office, 1st Office Action in Japanese Patent Application No. 2012-166345 (Nov. 13, 2013).
Japanese Patent Office, International Search Report in International Patent Application No. PCT/JP2013/069908 (Oct. 29, 2013).
European Patent Office, Communication Pursuant to Article 94(3) EPC in European Patent Application No. 13822644.4 (Dec. 23, 2014).
Korean Patent Office, Notice of Preliminary Rejection in Korean Patent Application No. 10-2014-7019244 (Nov. 27, 2015) English translation.

* cited by examiner

HEAT-SHRINKABLE POLYESTER FILM AND PACKAGES

CROSS-REFERENCE TO RELATED APPLICATIONS

This patent application is the U.S. national phase of International Patent Application No. PCT/JP2013/069908, filed Jul. 23, 2013, which claims the benefit of Japanese Patent Application No. 2012-166345, filed on Jul. 26, 2012, which are incorporated by reference in their entireties herein.

TECHNICAL FIELD

The present invention relates to a heat-shrinkable polyester film and packages suitable label applications.

BACKGROUND ART

Recently, in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyethylene resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in chemical resistance, and the use amount tends to increase being accompanied by an increase in turn volume of PET containers.

As a heat-shrinkable polyester film, one which is allowed to greatly shrink in the width direction has been widely utilized so far. Although the heat-shrinkable polyester film in which the width direction is the main shrinkage direction has been subjected to drawing at a high ratio in the width direction in order to allow the shrinkage properties in the width direction to be developed, with regard to the longitudinal direction orthogonal to the main shrinkage direction, there have been many cases in which the film is only subjected to drawing at a low ratio and there is also a case in which the film is not subjected to drawing. Such a film subjected to drawing at a low ratio in the longitudinal direction and a film subjected to drawing only in the width direction have a drawback that the mechanical strength in the longitudinal direction is poor.

Further, as a heat-shrinkable film, a film is generally utilized which greatly shrinks in the width direction in terms of handleability in label production. Hence, the conventional heat-shrinkable polyester film has been produced by drawing at a high ratio in the width direction in order to exhibit a sufficient shrinkage force in the width direction at heating.

Incidentally, it is desirable that a heat-shrinkable film have heat shrinkage properties such that the shrinkage gently increases with a rise in temperature. In the case where the shrinkage force rapidly increases on heating, since the shrinkage speed is too high, at the time of allowing a label with which a PET bottle or the like is covered to shrink in a steam tunnel, troubles such as distortion and jumping (allowing the label to shift upward) occur. On that account, an investigation of production conditions has been conducted so that the shrinkage gently increases with a rise in temperature.

For example, Non-Patent Document 1 describes that a film in which the shrinkage gently increases with a rise in temperature (the shrinkage speed is low) can be produced by allowing the drawing temperature in the width direction to be high and allowing the orientation in the shrinkage direction to be reduced or by allowing the heat treatment temperature after drawing in the width direction to be high, allowing the orientation in the main shrinkage direction to be fixed and allowing the shrinkage at the low temperature side to be reduced.

However, although it is possible to allow the shrinkage speed to be low by the production method described in Non-Patent Document 1, the shrinkage stress is reduced at the same time, and therefore in the case where the film is used as a label for a PET bottle or the like, the slack of the label after shrinkage and the like are generated and this is not preferred even from the viewpoints of the performance and the appearance.

On the other hand, the present applicant has consistently continued the development of a heat-shrinkable polyester film and has published a number of techniques. For example, Patent Document 1 discloses a heat-shrinkable polyester film satisfactory in perforation openability. However, there is no respite in user's demands, and a heat-shrinkable polyester film further excellent in shrinkage finishing properties has been desired.

PRIOR ART DOCUMENT

Patent Document

Patent document 1: International Publication No. 2010/137240
Non-Patent Document 1: Kiyomi UENOMACHI, "Shrinkage property control of heat-shrinkable polyester film", Seikeikakou, Vol. 6, No. 10, (1994), p. 679-682.

SUMMARY OF THE INVENTION

Problems to be Solved by the Invention

An object of the present invention is to solve the above problems and to provide a heat-shrinkable polyester film in which the shrinkage speed is low, the shrinkage gently increases with a rise in temperature, the shrinkage stress is increased, and furthermore, excellent shrinkage finishing properties are attained.

Means for Solving the Problem

The present invention to solve the above problems, a heat-shrinkable polyester film, having a ratio A1/A2 of an absorbancy A1 at 1340 $cm^{-1}$ to an absorbancy A2 at 1410 $cm^{-1}$ obtained when measured by a polarized ATR-FTIR method of not less than 0.65 and not more than 0.9 in the main shrinkage direction of the film and of not less than 0.45 and not more than 0.75 in the direction orthogonal to the main shrinkage direction, and a hot-water heat shrinkage obtained when immersed in hot water at 90° C. for 10 seconds of not less than 40% and not more than 60% in the main shrinkage direction of the film and of not less than 0% and not more than 12% in the direction orthogonal to the main shrinkage direction.

The heat-shrinkable polyester film preferably has a maximum shrinkage stress in the main shrinkage direction of the film obtained when measured with hot air at 90° C. of not less than 7 MPa and not more than 14 MPa, and a shrinkage stress at the end of 30 seconds after the initiation of measurement of not less than 60% and not more than 100% of the maximum shrinkage stress.

The heat-shrinkable polyester film preferably has an absolute value $|\Delta_{90\text{-}80} - \Delta_{80\text{-}70}|$ of the difference between a difference $\Delta_{90\text{-}80}$ between a hot-water shrinkage at 90° C. and a hot-water shrinkage at 80° C. and a difference $\Delta_{80\text{-}70}$ between a hot-water shrinkage at 80° C. and a hot-water shrinkage at 70° C. obtained when immersed in hot water at each of the temperatures of 90° C., 80° C. and 70° C. for 10 seconds and measured in the main shrinkage direction of not more than 5%, a right-angled tearing strength per unit thickness in the direction orthogonal to the main shrinkage direction after being shrunk by 10% in the main shrinkage direction in hot water at 80° C. of not less than 180 N/mm and not more than 310 N/mm, and a tensile breaking strength in the direction orthogonal to the main shrinkage direction of not less than 90 MPa and not more than 220 MPa.

The present invention comprises a packaging body, comprising a label prepared from the heat-shrinkable polyester film provided with a perforation or a notch, the label being formed by being allowed to cover at least a part of the outer periphery of an object to be packaged and then to shrink by heat.

Effects of the Invention

The heat-shrinkable polyester film according to the present invention features that the shrinkage gently increases in the width direction which is the main shrinkage direction with a rise in temperature (the shrinkage speed is low), and the mechanical strength in the longitudinal direction orthogonal to the width direction is high, and therefore the film can be very efficiently mounted within a short time to a container such as a bottle when used as a label for a PET bottle or the like, and the satisfactory finish with extremely reduced wrinkles and insufficient shrinkage can be developed when allowed to shrink by heat. Moreover, since the film strength is high, the film is satisfactory in processing properties at the time of performing printing processing and tubing processing.

Furthermore, since the attenuation rate of the shrinkage stress is low and the shrinkage stress at the end of 30 seconds after the initiation of shrinkage is high, the film is satisfactory in followability even when a container expands with heat at the time of heating in a label mounting process, the slack of the label is hardly generated, and a satisfactory appearance can be attained. In addition, the perforation openability which the label has is satisfactory, and it is possible to beautifully cut the film along the perforation from the beginning of tearing up to the completion of the tearing at the time of opening the label.

Moreover, since the heat-shrinkable polyester film according to the present invention is a film produced by being biaxially drawn longitudinally and laterally, the film can be very efficiently produced. Moreover, with regard to the heat-shrinkable polyester film according to the present invention, the adhesive force at the time of allowing front and back surfaces (or two front or back surfaces) to be bonded together by a solvent is extremely high, and the film can be suitably used for various cover labels and the like including a label for a PET bottle and the like.

Then, a package packaged with a label obtained from the heat-shrinkable polyester film according to the present invention has a beautiful appearance.

MODE FOR CARRYING OUT THE INVENTION

Figure 1:
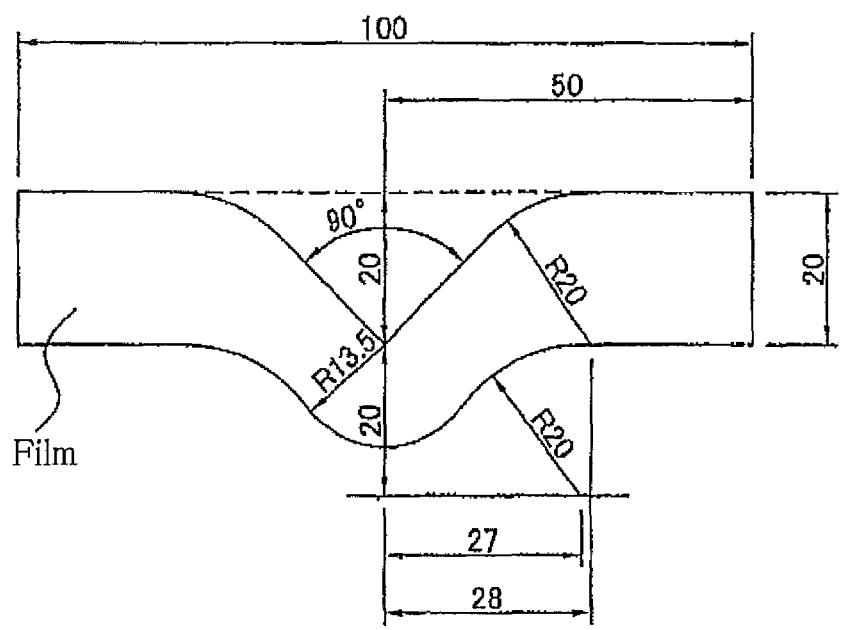
FIG. 1 is an explanatory illustration showing a shape of a test specimen for the measurement of the right-angled tearing strength (In this connection, the unit of the length of each portion of the test specimen in the Figure is mm, and R denotes the radius).

The polyester used in the heat-shrinkable polyester film of the present invention is a polyester whose main constituent is ethylene terephthalate. Ethylene terephthalate unit is 50% by mole or more, preferably 60% by mole or more in the constituent unit of 100% by mole. Other dicarboxylic acid components constituent the polyester of the present invention can include aromatic dicarboxylic acids such as isophthalic acid, naphthalenedicarboxylic acid and orthophthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole. A heat-shrinkable polyester film obtained by using a polyester that contains 3% by mole or more of these aliphatic dicarboxylic acids is insufficient in film stiffness at high-speed attachment.

Further, it is preferable not to contain polybasic carboxylic acids of tribasic or more (for example, trimellitic acid, pyromellitic acid and anhydride thereof etc.). A heat-shrinkable polyester film obtained by using a polyester containing these polybasic carboxylic acids is hard to achieve a necessary high shrinkage.

Diol components constitute the polyester include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

The polyester used in the present invention is preferably a polyester containing one kind or more of cyclic diols such as 1,4-cyclohexanedimethanol and diols having 3 to 6 carbon atoms (for example, 1,3-propanediol, 1,4-butanediol, neopentyl glycol and hexanediol etc.) and adjusting a glass transition point (Tg) in 60 to 80° C.

Further, the polyester preferably has 13% by mole or more of the sum of at least one monomer capable of forming an amorphous component in 100% by mole of the polyhydric alcohol component or in 100% by mole of the polybasic carboxylic acid component in the whole polyester resin, more preferably 14% by mole or more, further more preferably 15% by mole or more, and particularly preferably 16% by mole or more. An upper limit of the sum of at least one monomer capable of forming an amorphous component is not particular limited, but the upper limit is preferably 30% by mole or less.

As a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol or isophthalic acid is preferably used.

In a polyester used in the heat-shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a necessary high shrinkage. Further, in the polyester, it is preferable not to contain diethylene glycol, triethylene glycol and polyethylene glycol as far as possible.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber.

By adding fine particles as lubricant to a resin for forming the heat-shrinkable polyester film of the present invention, it is preferable to make workability (slipperiness) of the film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

It is also possible to conduct corona treatment, coating treatment, frame treatment etc. on the heat-shrinkable polyester film of the present invention in order to enhance adhesiveness of film surface.

With regard to the heat-shrinkable polyester film according to the present invention, the ratio A1/A2 of an absorbancy A1 at 1340 $cm^{-1}$ to A2 at 1410 $cm^{-1}$ obtained when measured by polarized ATR-FTIR method (hereinafter, may be referred to simply as the absorbancy ratio) needs to be not less than 0.65 and not more than 0.9 in the main shrinkage direction (hereinafter, the width direction) of the film and not less than 0.45 and not more than 0.75 in the direction orthogonal to the main shrinkage direction (hereinafter, the longitudinal direction).

The absorbancy ratio represents the trans conformation ratio of the molecular orientation. It has hitherto been considered that the amorphous orientation related to the shrinkage is affected by the gauche conformation ratio. However, in Non-Patent Document 1 described above, there is almost no change in the gauche conformation ratio even when the film-forming conditions are modified to change the shrinkage, and a ratio which is changed by the modification of film-forming conditions is the trans conformation ratio. The heat-shrinkable film described in Non-Patent Document 1 is a uniaxially drawn film drawn only in the width direction which is the main shrinkage direction, and is not a film that satisfies various properties required for the heat-shrinkable polyester film. As such, the present inventors have focused their attention on the molecular orientation (the trans conformation ratio) in a film drawn in two axial directions of the longitudinal direction (MD direction) and the width direction (TD direction), and have conducted studies on the trans conformation ratio of the longitudinal direction and the width direction in order to ascertain what kind of molecular orientation is the molecular orientation exhibiting suitable heat shrinkage properties. Thus the present invention has been completed.

That is, the present inventors have obtained experimental results that the change in trans conformation ratio is related to the shrinkage by allowing the drawing temperature and the like to be modified. Accordingly, it is considered that a ratio which represents the molecular orientation related to the heat shrinkage is the trans conformation ratio. It is considered that the trans conformation represents the state of entangled molecular chains, and when the trans conformation ratio is high, the degree of entanglement of molecular chains is also high. In Non-Patent Document 1, it is considered that the ease of shrinkage varies with the difference of the structure of the molecular chain (the length of the rotational isomer) in the case where polyester prepared with amorphous monomers is used as a raw material. For this reason, when the degree of entanglement of molecular chains easily allowed to shrink is high, by applying sufficient heat to loosen the entanglement, the entanglement of molecular chains is allowed to relax and the degree thereof is reduced (the change in molecular chains becomes large) and it is considered that the shrinkage also becomes high.

Moreover, in Non-Patent Document 1, the absorbancy ratio of the trans conformation is determined from a ratio of 795 $cm^{-1}$ and 975 $cm^{-1}$. However, there are also several other absorbancies that can be employed for measuring the trans conformation ratio. In the present invention, as a result of determining a trans conformation index from a plurality of absorbancy ratios with reference to the document {Atlas of polymer and plastic analysis: Vch verlagsgesellschaft mbh, 370 (1991)}, since the absorbancy ratio A1/A2 of 1340 $cm^{-1}$ and 1410 $cm^{-1}$ has the greatest difference between values, the trans conformation ratio is determined from this absorbancy ratio. That is, in the present invention, this absorbancy ratio A1/A2 is defined as the trans conformation ratio.

In the width direction of the film, the absorbancy ratio needs to fall within the range of 0.65 to 0.9. Since the molecular orientation becomes high when the absorbancy ratio in the width direction of the film is less than 0.65, it is not preferred because the shrinkage at 90° C. is reduced. The absorbancy ratio is more preferably not less than 0.67, and further preferably not less than 0.69. In contrast, since the molecular orientation becomes too high when the absorbancy ratio in the width direction of the film is more than 0.9, the shrinkage speed becomes high (does not gently shrink) and wrinkles and strains are easily generated on the label after shrinkage. The absorbancy ratio in the width direction is more preferably not more than 0.88, and further preferably not more than 0.86.

On the other hand, in the longitudinal direction of the film, the absorbancy ratio needs to fall within the range of 0.45 to 0.75. Since the molecular orientation becomes low when the absorbancy ratio in the longitudinal direction of the film is less than 0.45, the tensile breaking strength in the longitudinal direction is reduced and the right-angled tearing strength is increased. Moreover, since the shrinkage speed becomes high, wrinkles become easy to be generated on the label after shrinkage. The absorbancy ratio in the longitudinal direction of the film is more preferably not less than 0.48, and further preferably not less than 0.5. Moreover, since the molecular orientation becomes high when the absorbancy ratio in the longitudinal direction of the film is higher than 0.75, it is preferred in the point that the tensile breaking strength in the longitudinal direction is also increased, but the hot-water shrinkage at 90° C. in the longitudinal direction of the film also becomes too high. As a result, wrinkles and strains are easily generated on the label after shrinkage. The absorbancy ratio in the longitudinal direction of the film is more preferably not more than 0.73, and further preferably not more than 0.71.

In the present invention, as described below, a film is drawn in the longitudinal direction of the film, after which the film is drawn in the width direction of the film. With regard to the film drawn in two axial directions, when the draw ratios in the longitudinal direction and width direction are close to each other, it is common that the orientation in the final drawing direction becomes high. In the present invention, since the final drawing direction is the width direction, there is no possibility that the trans conformation ratio in the longitudinal direction of the film becomes higher than the trans conformation ratio in the width direction of the film. Accordingly, with regard to the trans conformation ratio in the film according to the present invention, in all cases, the value in the width direction of the film is a value higher than that in the longitudinal direction of the film.

The difference between the trans conformation ratio in the width direction of the film and the trans conformation ratio in the longitudinal direction of the film is preferably not less than 0.15. When the difference between those in the width direction and longitudinal direction of the film is less than 0.15, this means being high in molecular orientation in the longitudinal direction and the drawing stress at the time of being drawn in the width direction becomes high. As a result, it is not preferred because the maximum shrinkage stress in the width direction of the film obtained when measured with hot air at 90° C. becomes higher than 14 MPa. The difference between the trans conformation ratios in the width direction and longitudinal direction of the film is more preferably not less than 0.16, and further preferably not less than 0.17. In contrast, the difference between the trans conformation ratios in the width direction and longitudinal direction of the film is preferably not more than 0.5. Since the molecular orientation in the width direction becomes too high, the shrinkage speed becomes high (does not gently shrink), wrinkles and strains are easily generated on the label after shrinkage, and since the molecular orientation in the longitudinal direction becomes low, it is not preferred because the tensile breaking strength in the longitudinal direction is reduced and the right-angled tearing strength is increased.

With regard to the heat-shrinkable polyester film according to the present invention, the heat shrinkage in the width direction (the main shrinkage direction) of the film which is calculated from the lengths before and after shrinkage obtained by allowing the film in a no-load state to be immersed for 10 seconds in hot water at 90° C. and immediately allowing the film to be immersed for 10 seconds in water at 25° C.±0.5° C. according to the following Equation 1 (namely, the hot-water heat shrinkage at 90° C.) is preferably not less than 40% and not more than 60%.

Heat shrinkage={(the length before shrinkage–the length after shrinkage)/the length before shrinkage}×100(%)   Equation 1

When the hot-water heat shrinkage in the width direction at 90° C. is not less than 40%, since a sufficient shrinkage amount can be secured, in the case of being used as a label, wrinkles and slack become difficult to be generated on the label after heat shrinkage. The hot-water shrinkage at 90° C. is more preferably not less than 44%, and further preferably not less than 45%. Moreover, since the film is allowed to gently shrink when the hot-water heat shrinkage in the width direction at 90° C. is not more than 60%, strains become difficult to be generated on the label after shrinkage. The hot-water heat shrinkage at 90° C. is more preferably not more than 58%, and further preferably not more than 56%.

Moreover, with regard to the heat-shrinkable polyester film according to the present invention, the hot-water heat shrinkage at 90° C. in the longitudinal direction (the direction orthogonal to the main shrinkage direction) of the film obtained when measured in the same manner as above is preferably not less than 0% and not more than 12%. When the hot-water heat shrinkage in the longitudinal direction at 90° C. is not less than 0% (that is, does not extend by heating), it is preferred because a satisfactory shrinkage appearance can be attained at the time of being used as a label for a bottle, and when the hot-water heat shrinkage in the longitudinal direction at 90° C. is not more than 12%, it is preferred because strains become difficult to be generated on the label after heat shrinkage. The hot-water heat shrinkage in the longitudinal direction at 90° C. is more preferably not less than 0.5% and not more than 10%, and further preferably not less than 1% and not more than 8%.

With regard to the heat-shrinkable polyester film according to the present invention, it is preferred that the maximum shrinkage stress in the width direction of the film obtained when measured with hot air at 90° C. be not less than 7 MPa and not more than 14 MPa, and the shrinkage stress at the end of 30 seconds after the initiation of measurement be not less than 60% and not more than 100% of the maximum shrinkage stress. In this connection, the measurement for the shrinkage stress is performed by a method described in Examples.

When the maximum shrinkage stress at 90° C. in the width direction of the film is less than 7 MPa, it is not preferred because at the time of being used as a label for a bottle, the label is slackened and may not be closely brought into contact with the bottle. The maximum shrinkage stress at 90° C. is more preferably not less than 7.5 MPa, and further preferably not less than 8 MPa. Conversely, when the maximum shrinkage stress at 90° C. is more than 14 MPa, it is not preferred because the film is no longer allowed to gently shrink and strains become easy to be generated on the label after heat shrinkage. The maximum shrinkage stress at 90° C. is more preferably not more than 13.5 MPa, and further preferably not more than 13 MPa.

The shrinkage stress at the end of 30 seconds after the initiation of measurement in hot air at 90° C. is preferably not less than 60% and not more than 100% relative to the maximum shrinkage stress. That is, the heat-shrinkable polyester film according to the present invention features specific heat shrinkage properties such that the shrinkage stress almost comparable to the maximum heat shrinkage stress is developed even at the end of 30 seconds after the film begins to shrink by heat. When the shrinkage stress at the end of 30 seconds/the maximum shrinkage stress (hereinafter, the stress ratio) is less than 60%, it is not preferred because at the time of covering a bottle with a label and allowing the label to shrink by heating, the followability of the label becomes poor in the case where the bottle is allowed to expand by heating, and the label is slackened when the temperature of the bottle is lowered after shrinkage and then the heat expansion is eliminated. The stress ratio is more preferably not less than 75%, and further preferably not less than 80%. Although a higher stress ratio is preferred because the followability is more improved, it is improbable that the shrinkage stress at the end of 30 seconds exceeds the maximum shrinkage stress, and therefore the upper limit thereof is 100%.

With regard to the heat-shrinkable polyester film according to the present invention, it is preferred that the absolute value $|\Delta_{90\text{-}80}-\Delta_{80\text{-}70}|$ of the difference between a difference $\Delta_{90\text{-}80}$ between a hot-water shrinkage at 90° C. and a hot-water shrinkage at 80° C. and a difference $\Delta_{80\text{-}70}$ between a hot-water shrinkage at 80° C. and a hot-water shrinkage at 70° C. obtained when immersed in hot water at each of the temperatures of 90° C., 80° C. and 70° C. for 10 seconds and measured in the main shrinkage direction be not more than 5%.

The smaller the value of $|\Delta_{90\text{-}80}-\Delta_{80\text{-}70}|$ is, the more the shrinkage is allowed to gently increase with a rise in temperature (the lower the shrinkage speed is). The value of $|\Delta_{90\text{-}80}-\Delta_{80\text{-}70}|$ is more preferably not more than 4%, and further preferably not more than 3%. In this connection, the lower limit of the difference between shrinkages is 0%.

In the heat-shrinkable polyester film of the present invention, when right-angled tearing strength per unit thickness in the longitudinal direction after being shrunk by 10% in the width direction in hot water at 80° C., the right-angled tearing strength per unit thickness in the longitudinal direction is preferable 180 N/mm or more and 310 N/mm or less. The measurement for the right-angled tearing strength is performed by a method described in Examples.

When the right-angled tearing strength is less than 180 N/mm, a situation in which the film is easily torn by an impact such as falling during transportation is possibly caused when the film is used as a label, whereby the case is unpreferred, conversely, when the right-angled tearing strength is more than 310 N/mm, it is not preferable because cutting property (easiness of tearing) become bad at an early stage of tearing a label. The right-angled tearing strength is more preferably 185 N/mm or more, further preferably 190 N/mm or more, particularly preferably 195 N/mm or more, most preferably 200 N/mm or more. The right-angled tearing strength is more preferably 300 N/mm or less, further preferably 295 N/mm or less, particularly preferably 290 N/mm or less.

In the heat-shrinkable polyester film of the present invention, when tensile breaking strength in the longitudinal direction is preferably 90 MPa or more and 220 MPa or less. The measurement for the right-angled tearing strength is performed by a method described in Examples. When the tensile breaking strength in the longitudinal direction is less than 90 MPa, it is not preferable because stiffness becomes weak when attached on a bottle etc. as a label, conversely, when the tensile breaking strength is more than 220 MPa, it is not preferable because cutting property (easiness of tearing) become bad at an early stage of tearing a label. The tensile breaking strength is preferably 100 MPa or more, more preferably 110 MPa or more, and particularly preferably 120 MPa or more. The tensile breaking strength is preferably 210 MPa or less, more preferably 200 MPa or less, and particularly preferably 190 MPa or less.

The thickness of the heat-shrinkable polyester film of the present invention is not particularly limited, but 10 μm or more and 70 μm or less is preferable, and the heat-shrinkable polyester film of the present invention preferably has a haze value of 2% or more and 13% or less. When the haze value exceeds 13%, it is not preferable because transparency becomes bad, so that there is a probability that appearance becomes bad in a label production. Additionally, the haze value is more preferably 11% or less, and particularly preferably 9% or less. Further, the smaller the haze value, the better, but the lower limit is about 2% from considerations that a predetermined amount of a lubricant may be added to the film in order to provide slipperiness necessary for practical use or the like.

In a method for producing the heat-shrinkable polyester film of the present invention, the foregoing polyester raw material is melt-extruded by an extruder to form an undrawn film, and the undrawn film is biaxially drawn by a predetermined method shown below and heat-treated. In this connection, polyester can be obtained by allowing the suitable dicarboxylic acid component and diol component mentioned above to undergo a polycondensation by a known method. Moreover, usually, two or more kinds of chip-like polyesters are mixed to be used as raw materials.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the width direction under a predetermined condition as described below, and the film after lengthwise drawing is quenched after annealing, and then heat-treated once, the film after the heat treatment is cooled in a predetermined condition, and then drawn in the width direction under a predetermined condition, and heat-treated once again, thereby obtaining a heat-shrinkable polyester film of the present invention. Hereinafter, a preferable film forming method to obtain a heat-shrinkable polyester film of the present invention is described in detail by considering the difference from the film forming method of the conventional heat-shrinkable polyester film.

[Film Forming Method of Heat-Shrinkable Polyester Film of the Present Invention]

As described above, generally, a heat-shrinkable polyester film can be produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of simply drawing in the width direction, as described above, mechanical strength in the longitudinal direction becomes small, perforation-tear property as a label become bad. In addition, it is difficult to increase a line speed of a film forming equipment.

Moreover, in the case of simply drawing in the width direction, as described above, it follows that the shrinkage stress in the width direction and the shrinkage speed conflict with each other, and the finishing properties at the time of allowing the film as a label for a bottle for beverage or the like to shrink and the slack (followability) of the label with which a bottle is covered after allowed to shrink are insufficient.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finishing after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finishing after being shrunk and attached as a label becomes bad.

Furthermore, based on problems in the production of the foregoing conventional heat-shrinkable polyester film, the present inventors have studied further on consideration for obtaining a heat-shrinkable polyester film with good perforation-tear property and high productivity, and as a result, they have achieved the following knowledge.

In order for perforation-tear property as a label to be good, it is considered that molecules oriented in the longitudinal direction need to be left in some extent.

In order for finishing after shrinkage-attachment as a label to be good, it is essential not to exhibit shrinkage force in the longitudinal direction, therefore it is considered that the state of tension of molecules oriented in the longitudinal direction need to be canceled out.

It is considered that the shrinkage speed can be lowered by leaving the molecules oriented in the longitudinal direction since a change in molecular orientation in the width direction at the time of being allowed to shrink in the width direction becomes slow.

It is considered that the followability can be improved by leaving the molecules oriented in the longitudinal direction since a reduction in shrinkage stress with time, which is generated at the time of being allowed to shrink in the width direction, is suppressed.

Based on the above-mentioned findings, the present inventors have found that in order to simultaneously satisfy achieving both satisfactory shrinkage finishing properties and followability and attaining perforation openability, it is necessary to allow "molecules not contributed to shrinkage force while being oriented in the longitudinal direction" to be present in the film and to allow the film to have an appropriate molecular orientation. Then, they have paid attention on how to carry out drawing in order for "molecules not contributed to shrinkage force while being oriented in the longitudinal direction" to be able to be present in a film and had a trial and error. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat-shrinkable polyester film satisfying good perforation-tear property, finish properties after shrinkage, and followability at the same time.
(1) Control of lengthwise drawing condition
(2) Intermediate heat treatment after lengthwise drawing
(3) Natural cooling between intermediate heat treatment and transverse drawing
(4) Forced cooling of film after natural cooling
(5) Control of transverse drawing condition
(6) Heat treatment after transverse drawing
(7) During the course of the above-mentioned production process, a process in which the film is allowed to relax in the longitudinal direction two or more times is provided.

Hereinafter, each of the procedures mentioned above will be sequentially described.
(1) Control of Lengthwise Drawing Condition In the production of the film according to the present invention by a lengthwise-transverse drawing method, it is necessary to set the drawing temperature to a temperature of not lower than Tg and not higher than Tg+30° C. and to lengthwise drawing the film so as to allow the draw ratio to be not less than 3.3 times and not more than 4.6 times. With regard to the lengthwise drawing, either of single-stage drawing and multi-stage drawing which is two or more-stage drawing can be used.

When the total lengthwise draw ratio becomes large at the time of drawing a film in the lengthwise direction, although there is a tendency for the shrinkage in the longitudinal direction to become large, it is possible to control the molecular orientation in the longitudinal direction by an intermediate heat treatment after lengthwise drawing and the relaxation in the longitudinal direction. However, when the lengthwise draw ratio is too large, since oriented crystallization of the film after lengthwise drawing progresses and it is not preferred because breakage is easily generated at a transverse drawing process, the upper limit of the lengthwise draw ratio is set to 4.6 times. The lengthwise draw ratio is more preferably not more than 4.5 times, and further preferably not more than 4.4 times. In contrast, when the lengthwise draw ratio is too small, although the shrinkage in the longitudinal direction is reduced, it is not preferred because the degree of molecular orientation in the longitudinal direction is reduced, the right-angled tearing strength in the longitudinal direction is increased, and the tensile breaking strength is reduced. The lower limit of the lengthwise draw ratio is preferably 3.3 times, more preferably 3.4 times, and further preferably 3.5 times.
(2) Intermediate Heat Treatment after Lengthwise Drawing In order for "molecules not contributed to shrinkage force while being oriented in the longitudinal direction" to be present in a film, it is preferable to thermally relax molecules oriented in the longitudinal direction, but conventionally, in biaxial drawing of a film, between the first-axial drawing and the second-axial drawing, when a film is subjected to heat treatment at high temperature, the film is crystallized after heat treatment, so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat treatment, transverse drawing is conducted in a predetermined condition, thereby without causing breakage in the transverse drawing, to be able to make "molecules not contributed to shrinkage force while being oriented in the longitudinal direction" present in the film.

Namely, in the production of the film of the present invention by a lengthwise-transverse drawing method, after an undrawn film is lengthwisely drawn, under a state that both edges in the width direction are held by clips in a tenter, it is necessary to conduct heat treatment (hereinafter called intermediate heat treatment) at a temperature of Tg+50° C. or more and Tg+90° C. or less for 3 second or more and 12 seconds or less. By conducting such intermediate heat treatment, it becomes possible that "molecules not contributed to shrinkage force while being oriented in the longitudinal direction" can be present in a film, from which it becomes possible to obtain a film in which perforation opening property are good as a label and no irregularity of shrinkage generates. Even in the case where any lengthwise drawing is conducted, "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Then, by conducting the following natural cooling, forced cooling and transverse drawing, it becomes possible to orient molecules to the width direction and exhibit shrinkage force in the width direction while maintaining "molecules not contributed to shrinkage force while being oriented in the longitudinal direction."

The temperature of the intermediate heat treatment is more preferably not lower than Tg+53° C., further preferably not lower than Tg+56° C., more preferably not higher than Tg+87° C., and further preferably not higher than Tg+84° C. It is necessary that the treatment time for the intermediate heat treatment be appropriately adjusted within a range of not shorter than 3.0 seconds and not longer than 12.0 seconds depending on the composition of raw materials. In the intermediate heat treatment, the quantity of heat given to the film is of importance, and when the temperature of the intermediate heat treatment is low, an extended period of the intermediate heat treatment is required. However, since the facilities are made more gigantic when the treatment time for the intermediate heat treatment is too long, it is preferred to appropriately adjust the process by the modification of the temperature and the treatment time.

By maintaining the temperature of the intermediate heat treatment at not lower than Tg+50° C., it is possible to increase the degree of molecular orientation in the longitudinal direction, and it is possible to maintain the tensile breaking strength in the longitudinal direction high while maintaining the right-angled tearing strength low. In contrast, by controlling the temperature of the intermediate heat treatment within a range of not higher than Tg+90° C., it is possible to suppress the crystallization of the film to maintain the drawability in the longitudinal direction and to suppress troubles caused by breakage. Moreover, it is possible to suppress the crystallization of the surface layer of the film to maintain the solvent adhesive strength high, and furthermore, it is also possible to reduce the irregularity of thickness in the longitudinal direction.

(3) Natural Cooling (Shutoff of Heating) Between Intermediate Heat Treatment and Transverse Drawing In production of a film by the lengthwise-transverse drawing method in the present invention, it is necessary to conduct intermediate heat treatment after lengthwise drawing, however, after the lengthwise drawing and intermediate heat treatment, the film is necessary to be passed through an intermediate zone where no heating operation is carried out actively for 0.5 seconds or more and 3.0 seconds or less. Namely, it is preferable that an intermediate zone is provided in front of a transverse drawing zone of a tenter for transverse drawing, a film after lengthwise drawing and intermediate heat treatment is introduced to the tenter and passed through the intermediate zone for a predetermined time, and then transverse drawing is carried out. In addition, in the intermediate zone, when a strip of paper is hung down without passing a film, an associated stream accompanied by movement of the film and hot air from the cooling zone are preferably shut off such that the paper strip hangs down almost completely in the vertical direction. When time for passing through the intermediate zone is less than 0.5 seconds, it is not preferable because transverse drawing becomes a high-temperature drawing, and shrinkage in the transverse direction cannot be increased sufficiently. Conversely, 3.0 seconds are sufficient time for passing through the intermediate zone, and even though setting a longer time than that, it will lead to needlessness of equipment, which is not preferable. The lower limit of the time for passing through the intermediate zone is preferably 0.7 seconds or more, and more preferably 0.9 seconds or more. Further, the upper limit of the time for passing through the intermediate zone is preferably 2.8 seconds or less, and more preferably 2.6 seconds or less.

(4) Forced Cooling of the Film after Natural Cooling

In production of a film by the lengthwise-transverse drawing method in the present invention, the film naturally cooled is not transversely drawn as it is, but it is necessary that a temperature of the film is forcibly cooled to be Tg or more and Tg+40° C. or less. By conducting such forced cooling treatment, it becomes possible to obtain a film with good perforation-opening property as a label. The lower limit of the temperature of the film after forced cooling preferably Tg+2° C. or more, more preferably Tg+4° C. or more, preferably Tg+35° C. or less, and more preferably Tg+30° C. or less.

In forced cooling a film, when the temperature of the film after forced cooling keeps exceeding Tg+40° C., shrinkage in the width direction of the film becomes low and shrinkage property becomes insufficient as a label, but by controlling the temperature of the film after forced cooling at Tg+40° C. or less, it becomes possible to maintain shrinkage in the width direction of the film high. Moreover, when the temperature of the film after forced cooling remains to be higher than Tg+40° C., the stress of the transverse drawing carried out after cooling is reduced, the shrinkage stress in the width direction is reduced, and the followability of the label to a bottle becomes poor. By subjecting the film to forced cooling such that the temperature of the film after cooling is allowed to be not higher than Tg+40° C., it is possible to maintain the shrinkage stress in the width direction high.

Further, in forced cooling a film, when the temperature of the film after keeps continues exceeding Tg+40° C., stress of transverse drawing carried out after cooling becomes small, and the irregularity of thickness in the width direction tends to become large, but by forced cooling a temperature of the film after cooling to be Tg+40° C. or less, it becomes possible to increase the stress of transverse drawing carried out after cooling and to reduce the irregularity of thickness in the width direction.

(5) Control of Transverse Drawing Condition

The transverse drawing is necessary carried out such that the ratio becomes 2 times or more and 6 times or less at Tg+10° C. or more and Tg+40° C. or less, in a state that both edges in the width direction are held by clips in a tenter. By conducting the transverse drawing in such a predetermined condition, it becomes possible to orient molecules to the width direction and exhibit shrinkage force in the width direction while maintaining "molecules not contributed to shrinkage force while being oriented in the longitudinal direction" formed by lengthwise drawing and intermediate heat treatment, from which it becomes possible to obtain a film in which perforation-opening property are good as a label. The temperature of transverse drawing is preferably Tg+13° C. or more, more preferably Tg+16° C. or more, preferably Tg+37° C. or less, and more preferably Tg+34° C. or less. On the other hand, the transverse drawing ratio is preferably 2.5 times or more, more preferably 3 times or more, preferably 5.5 times or less, and more preferably 5 times or less.

When the drawing temperature is higher than Tg+40° C. at the time of drawing a film in the transverse direction, the shrinkage in the width direction is reduced; however, by controlling the drawing temperature within a range of not higher than Tg+40° C., it is possible to increase the shrinkage in the width direction. Moreover, when the drawing temperature is higher than Tg+40° C., the stress of the transverse drawing is reduced, the shrinkage stress in the width direction is reduced, and the followability of the label to a bottle becomes poor. By subjecting the film to controlling so that the transverse drawing temperature is allowed to be not higher than Tg+40° C., it is possible to increase the shrinkage stress in the width direction. Furthermore, when the temperature of the film is higher than Tg+40° C., the drawing stress of the transverse drawing is reduced, and there is a tendency for the irregularity of thickness in the width direction to be easily increased. By subjecting the film to controlling so that the transverse drawing temperature is allowed to be not higher than Tg+40° C., it is possible to enhance the stress of the transverse drawing and to reduce the irregularity of thickness in the width direction.

In contrast, when the drawing temperature is lower than Tg+10° C., the film becomes easy to break at the time of being transversely drawn since the degree of molecular orientation in the width direction is extremely increased, and moreover, it is not preferred because voids present inside the film are increased and then the haze in the film is increased.

(6) Heat Treatment after Transverse Drawing

It is necessary that the film after transverse drawing be finally subjected to a heat treatment over a period of not shorter than 1 second and not longer than 9 seconds at a temperature of not lower than Tg° C. and not higher than Tg+50° C. in a state that both edges in the width direction are held by clips in a tenter. When the heat treatment temperature is higher than Tg+50° C., it is not preferred because the shrinkage in the width direction is lowered and the heat shrinkage at 90° C. becomes less than 40%. Moreover, when the heat treatment temperature is lower than Tg° C., it is not preferred because the film is not allowed to relax sufficiently in the width direction and the degree of shrinkage in the width direction (the so-called natural shrinkage) is increased with the lapse of time at the time of allowing a final product to be stored under ordinary temperature condition. Moreover, although it is preferred that the heat treatment time be set as long as possible, the facilities are made more gigantic when the treatment time is too long, and therefore it is preferred that the treatment time be set to not longer than 9 seconds.

(7) Relaxation Process in the Longitudinal Direction

As described above, in order to allow "molecules not contributed to shrinkage force while being oriented in the longitudinal direction" to be present in the film, it is preferred to allow molecules oriented in the longitudinal direction to be thermally relaxed. When the residual shrinkage stress in the longitudinal direction of the film after lengthwise drawing is increased, the film has a drawback that the shrinkage finishing properties become poor since the hot-water shrinkage in the longitudinal direction of the film after transverse drawing is increased. Although performing a heat treatment in the transverse drawing process is effective to reduce the hot-water shrinkage in the longitudinal direction of the film, it cannot be said that the hot-water shrinkage in the longitudinal direction of the film is sufficiently reduced only by relaxation by heat, and a large quantity of heat is required. However, when a large quantity of heat is given to the film at the time of relaxation by heat, the film is crystallized, the drawing stress is increased at the time of drawing the film in the width direction, the finally obtained shrinkages at 70° C. and 80° C. are increased, the value of $\Delta_{90-80}$ in the above-mentioned difference between shrinkages $|\Delta_{90-80}-\Delta_{80-70}|$ becomes small, and it becomes difficult to control the $|\Delta_{90-80}-\Delta_{80-70}|$ within a range of not more than 5%.

As such, the present inventors have conducted studies on the procedure for reducing the molecular orientation in the longitudinal direction of the film so much that the film satisfies the right-angled tearing strength and the tensile breaking strength, and controlling the difference between shrinkages and shrinkage stress in the width direction, and the right-angled tearing strength and tensile breaking strength in the longitudinal direction. Then, they have found that controlling can be performed by allowing the film to relax in the longitudinal direction with the procedure shown below. It is desirable that among the following (i) to (iii), any two processes be performed or all three processes be performed.

(i) A process of heating a film after lengthwise drawing at a temperature of not lower than Tg and not higher than Tg+90° C. and subjecting the film to relaxation of not less than 10% and not more than 50% in the longitudinal direction over a period of not shorter than 0.05 seconds and not longer than 5 seconds using rolls having a speed difference therebetween. As a heating means, any of a temperature conditioning roll, near infrared rays, far infrared rays, a hot air heater and the like can be used.

(ii) A process of subjecting a film to relaxation of not less than 5% and not more than 20% in the longitudinal direction over a period of not shorter than 0.1 seconds and not longer than 12 seconds by reducing the distance between clips for grasping opposite to each other in a tenter in the intermediate heat treatment process.

(iii) A process of subjecting a film to relaxation of not less than 5% and not more than 20% in the longitudinal direction over a period of not shorter than 0.1 seconds and not longer than 9 seconds by reducing the distance between clips for grasping opposite to each other in a tenter in the final heat treatment process.

Hereinafter, each of the processes will be described.

(i) Relaxation after Lengthwise Drawing

It is desirable to heat a film after lengthwise drawing at a temperature of not lower than Tg and not higher than Tg+90° C. and subject the film to relaxation of not less than 10% and not more than 50% in the longitudinal direction over a period of not shorter than 0.05 seconds and not longer than 5.0 seconds using rolls having a speed difference therebetween. When the temperature is lower than Tg, it is not preferred because the film after lengthwise drawing is not allowed to shrink and relaxation cannot be performed. In contrast, when the temperature is higher than Tg+90° C., it is not preferred because the film is crystallized and the transparency and the like become poor. The film temperature at the time of relaxation is more preferably not lower than Tg+10° C. and not higher than Tg+80° C., and further preferably not lower than Tg+20° C. and not higher than Tg+70° C.

Moreover, the time for performing relaxation in the longitudinal direction of the film after lengthwise drawing is preferably not shorter than 0.05 seconds and not longer than 5 seconds. When the time is shorter than 0.05 seconds, it is not preferred because the irregularity in relaxation is generated unless the temperature is allowed to be higher than Tg+90° C. since the time for relaxation becomes short. Moreover, although the film has no problem as a film when the time for relaxation is longer than 5 seconds since relaxation can be performed at low temperatures, it is preferred to appropriately adjust the process by the modification of the temperature and the time since the facilities are made more gigantic. The relaxation time is more preferably not shorter than 0.1 seconds and not longer than 4.5 seconds, and further preferably not shorter than 0.5 seconds and not longer than 4 seconds.

Moreover, when the relaxation rate in the longitudinal direction of the film after lengthwise drawing is less than 10%, relaxation of the molecular orientation in the longitudinal direction cannot be sufficiently performed, and there is a possibility that the value of the above-mentioned difference between shrinkages $|\Delta_{90-80}-\Delta_{80-70}|$ cannot be controlled within a range of not more than 5%. Moreover, when the relaxation rate in the longitudinal direction of the film after lengthwise drawing is larger than 50%, it is not preferred because the right-angled tearing strength in the longitudinal direction is increased and the tensile breaking strength is reduced. The relaxation rate of the film after lengthwise drawing is more preferably not less than 15% and not more than 45%, and further preferably not less than 20% and not more than 40%.

Examples of a method for allowing a film after lengthwise drawing to relax include a method of heating a film after lengthwise drawing with a heating apparatus (heating furnace) arranged between rolls and performing relaxation by taking advantage of the speed difference between the rolls; a method of heating a film after lengthwise drawing with a heating apparatus (heating furnace) arranged between a roll and a transverse drawing machine and allowing the speed of the transverse drawing machine to be lower than that of the roll, and the like. As the heating apparatus (heating furnace), any of a temperature conditioning roll, a near infrared ray heater, a far infrared ray heater, a hot air heater and the like can be used.

(ii) Relaxation in the Intermediate Heat Treatment Process

In the intermediate heat treatment process, it is desirable to subject a film to relaxation of not less than 5% and not more than 20% in the longitudinal direction over a period of not shorter than 0.1 seconds and not longer than 12 seconds by reducing the distance between clips for grasping opposite to each other in a tenter. When the relaxation rate is less than 5%, relaxation of the molecular orientation in the longitudinal direction cannot be sufficiently performed, and there is a possibility that the value of the above-mentioned difference between shrinkages $|\Delta_{90-80}-\Delta_{80-70}|$ cannot be controlled within a range of not more than 5%. Moreover, although the adjustment of physical properties of the film is possible when the relaxation rate is larger than 20%, the upper limit is set to 20% since the limit is 20% in view of restriction of facilities. The relaxation rate is more preferably not less than 8%, and further preferably not less than 11%.

Moreover, the time for performing relaxation in the longitudinal direction in the intermediate heat treatment process is preferably not shorter than 0.1 seconds and not longer than 12 seconds. When the time is shorter than 0.1 seconds, it is not preferred because the irregularity in relaxation is generated unless the temperature is allowed to be higher than Tg+90° C. since the time for relaxation becomes short. Moreover, although the film has no problem as a film when the relaxation time is longer than 12 seconds, it is preferred to appropriately adjust the process by the modification of the temperature and the time since the facilities are made more gigantic. The relaxation time is more preferably not shorter than 0.3 seconds and not longer than 11 seconds, and further preferably not shorter than 0.5 seconds and not longer than 10 seconds.

(iii) Relaxation in the Final Heat Treatment Process

In the final heat treatment process, it is desirable to subject a film to relaxation of not less than 5% and not more than 20% in the longitudinal direction over a period of not shorter than 0.1 seconds and not longer than 9 seconds by reducing the distance between clips for grasping opposite to each other in a tenter. When the relaxation rate is less than 5%, relaxation of the molecular orientation in the longitudinal direction cannot be sufficiently performed, and there is a possibility that the value of the above-mentioned difference between shrinkages $|\Delta_{90-80}-\Delta_{80-70}|$ cannot be controlled within a range of not more than 5%. Moreover, although the adjustment of physical properties of the film is possible when the relaxation rate is larger than 20%, the upper limit is set to 20% since the limit is 20% in view of restriction of facilities. The relaxation rate is more preferably not less than 8%, and further preferably not less than 11%.

Moreover, the time for performing relaxation in the longitudinal direction in the final heat treatment process is preferably not shorter than 0.1 seconds and not longer than 9 seconds. When the time is shorter than 0.1 seconds, it is not preferred because the irregularity in relaxation is generated unless the temperature is allowed to be higher than Tg+50° C. since the time for relaxation becomes short. Moreover, although the film has no problem as a film when the relaxation time is longer than 9 seconds, it is preferred to appropriately adjust the process by the modification of the temperature and the time since the facilities are made more gigantic. The relaxation time is more preferably not shorter than 0.3 seconds and not longer than 8 seconds, and further preferably not shorter than 0.5 seconds and not longer than 7 seconds.

The package of the present invention is a package in which a label provided with a perforation or a notch using the foregoing heat-shrinkable polyester film of the present invention is covered at least on a part of the outer periphery of an object to be packaged and then to shrink by heat, and as an object of the package, to start with PET bottles for beverage, various kinds of bottles and cans, plastic containers for confectionary or lunch bag etc., paper box and the like can be listed. In general, in the case where a label using a heat-shrinkable polyester film is covered on the packaging object and heat-shrunk, the label is heat-shrunk by about 5 to 30% and closely attached on the package. Additionally, a label covered on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

The present application claims the benefit of priority to Japan Patent Application Number 2012-166345 filed on Jul. 26, 2012. The entire contents of the specification of Japan Patent Application Number 2012-166345 filed on Jul. 26, 2012 are hereby incorporated by reference.

EXAMPLES

Hereinafter, the present invention is described in more detail by Examples, but the present invention is by no means limited to aspects of the Examples, and it can be suitably modified in the range not departing from the scope of the present invention. Evaluation methods of films using in the present invention are as follows.

[Absorbancy Ratio (Trans Conformation Ratio)]

Using an FT-IR spectrometer "FTS 60A/896" (manufactured by Varian Inc.), the infrared absorption spectrum was measured by ATR method utilizing polarized light under the conditions of a measuring wave number region of 650 to 4000 $cm^{-1}$ and a cumulative number of 128 times. A ratio A1/A2 of an absorbancy A1 at 1340 $cm^{-1}$ to an absorbancy A2 at 1410 $cm^{-1}$ is defined as the absorbancy ratio.

[Heat Shrinkage (Hot-Water Heat Shrinkage)]

A film was cut into a square of 10 cm×10 cm, treated and heat-shrunk in no load state for 10 seconds in hot water at a predetermined temperature ±0.5° C., and then the dimensions of the film in the lengthwise and transverse directions were measured, and heat shrinkage each was obtained according to the following Equation 1. The direction with the larger heat shrinkage was defined as a main shrinkage direction.

Heat shrinkage={(length before shrinkage−length after shrinkage)/length before shrinkage}×100(%)  Equation 1

[Shrinkage Stress]

A sample of 200 mm in length in the main shrinkage direction and 20 mm in width was cut out of a heat-shrinkable film, and measured for the shrinkage stress using a strength and elongation measuring machine with a heating furnace (TENSILON (a registered trademark of ORIENTEC Co., LTD)) manufactured by Toyo Baldwin Co., LTD (the present name ORIENTEC). The heating furnace was previously heated to 90° C., and the distance between chucks was set to 100 mm. The air blast blown into the heating furnace was once stopped, the door of the heating furnace was opened, the sample was fitted to the chucks, after which the door of the heating furnace was quickly closed and the air blast was restarted. The shrinkage stress was measured over a period of not shorter than 30 seconds, a shrinkage stress (MPa) at the end of 30 seconds was determined, and the maximum value obtained during the measurement was defined as the maximum shrinkage stress (MPa). Moreover, the ratio (percentage) of a shrinkage stress at the end of 30 seconds relative to the maximum shrinkage stress was defined as the stress ratio (%).

[Difference Between Shrinkages]

In the same manner as that for determining the heat shrinkage, a hot-water shrinkage in the main shrinkage direction at each of the temperatures of 90° C., 80° C. and 70° C. was measured. An absolute value $|\Delta_{90\text{-}80}-\Delta_{80\text{-}70}|$ of the difference between a difference $\Delta_{90\text{-}80}$ between a hot-water shrinkage at 90° C. and a hot-water shrinkage at 80° C. and a difference $\Delta_{80\text{-}70}$ between a hot-water shrinkage at 80° C. and a hot-water shrinkage at 70° C. was defined as the difference between shrinkages.

[Right-Angled Tearing Strength]

A film in a state of being previously slackened was mounted to a rectangular frame having a prescribed length (that is, both ends of the film were allowed to be grasped by the frame). Then, by immersing the film in hot water at 80° C. for about 5 seconds until the slackened film became a tensioned state within the frame (until the slack was eliminated), the film was allowed to shrink by 10% in the width direction. In accordance with JIS-K-7128-3, a test specimen with a shape shown in FIG. 1 was cut out of this film which had been allowed to shrink by 10%. In this connection, at the time of cutting out the test specimen, the longitudinal direction of the film was directed along the tearing direction. Next, both ends (in the width direction) of the test specimen was allowed to be grasped with a universal tensile testing machine ("Autograph" manufactured by SHIMADZU CORPORATION), the tensile test was performed under the condition of a tensile speed of 200 mm/minute, and a maximum load at the time of being completely torn apart in the longitudinal direction of the film was measured. By dividing the maximum load by the thickness of the film, a right-angled tearing strength per unit thickness was calculated.

[Tensile Breaking Strength]

A test specimen with a strip-like shape of 140 mm in the measurement direction (the longitudinal direction of the film) and 20 mm in the direction orthogonal to the measurement direction (the width direction of the film) was prepared. Using a universal tensile testing machine "DSS-100" (manufactured by SHIMADZU CORPORATION), each of 20 mm grasping margins located at both ends of the test specimen was fixed to a chuck (the distance between chucks of 100 mm), the tensile test was performed under the conditions of an atmospheric temperature of 23° C. and a tensile speed of 200 mm/minute, and the strength (stress) at the time of being torn and broken was defined as the tensile breaking strength.

[Shrinkage Strain of Label]

By bonding both ends of a heat-shrinkable film with dioxolan, a cylindrical label (a label setting the main shrinkage direction of a heat-shrinkable film to the peripheral direction) was produced. Thereafter, using a steam tunnel (type: SH-1500-L) manufactured by Fuji Astec Inc., the label was attached on a PET bottle of 500 ml (diameter 62 mm, minimum diameter of neck part 25 mm) by heat shrinkage at a zone temperature of 80° C. with a passing time of 2.5 seconds. Additionally, upon attaching, adjustment was done so that the part having a diameter of 40 mm was set to one end of the label in the neck part. For evaluating finishing properties after shrinkage, the strain in the direction of 360 degrees at the upper part of the mounted label was measured using a gauge and the maximum value of the strain was determined. The finishing properties were evaluated according to the following criteria.

Excellent: maximum strain less than 1 mm
Good: maximum strain 1 mm or more, less than 2 mm
Poor: maximum strain 2 mm or more

[Label Adhesiveness]

Under the same conditions as those for the shrinkage strain of the label mentioned above, a label was attached to a PET bottle. The label adhesiveness was evaluated according to the following criteria.

Excellent: There is no slack between the attached label and the PET bottle and the label does not move even when the cap portion of the bottle is fixed and the label is twisted.
Good: Although the label does not move even when the cap portion of the bottle is fixed and the label is twisted, there is a little slack between the label and the PET bottle.
Poor: The label is allowed to shift when the cap portion of the bottle is fixed and the label is twisted.

[Wrinkles of Label]

Under the same conditions as those for the shrinkage strain of the label mentioned above, a label was attached to a PET bottle and the occurrence state of wrinkles was evaluated according to the following criteria.

Excellent: The number of wrinkles with a size of not less than 2 mm is zero.
Good: The number of wrinkles with a size of not less than 2 mm is not less than 1 and not more than 2.
Poor: The number of wrinkles with a size of not less than 2 mm is not less than 3.

[Perforation Opening Property]

A label to which perforations were previously provided in the direction orthogonal to the main shrinkage direction was attached on a PET bottle in the same condition as in the foregoing measuring condition of shrinkage strain. The perforation was formed by providing a hole of 1 mm long in the intervals of 1 mm, and two lines of perforations were provided in width 22 mm and length 120 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly not torn along the perforations in the lengthwise direction thereby to be not able to remove the label from the bottle was counted, the total samples of 50 minus the above number of bottles, and a ratio (%) relative to the total samples of 50 was calculated as a perforation opening defective ratio. The perforation opening defective ratio is 20% or less, practically, it is acceptable.

<Preparation of Polyester Raw Material>

Into an autoclave made of stainless steel equipped with a stirrer, a thermometer and a partial reflux condenser, 100 mol % of dimethyl terephthalate (DMT) as a dibasic acid component and 100 mol % of ethylene glycol (EG) as a glycol component were charged such that ethylene glycol became 2.2 times to dimethyl terephthalate in mole ratio, and using 0.05 mol % (relative to acid component) of zinc acetate as an ester exchange catalyst, ester exchange reaction was conducted while distilling methanol generated out of the system. Thereafter, 0.025 mol % (relative to acid component) of antimony trioxide as a polycondensation catalyst was added thereto, polycondensation reaction was carried out at 280° C. under a reduced pressure of 26.6 Pa (0.2 torr). A polyester (A) of 0.70 dl/g in intrinsic viscosity was obtained. This polyester is polyethylene terephthalate. In the above-described production of polyester (A), $SiO_2$ (Silysia 266 manufactured by Fuji Silysia Chemical, Ltd.) was added as a lubricant at a proportion of 8,000 ppm relative to the polyester. Further, in the same way as described above, polyesters (A2, B, C, D) shown in Table 1 were synthesized. In the Table, NPG is neopentyl glycol, CHDM is 1,4-cyclohexanedimethanol, and BD is 1,4-butanediol. Regarding the intrinsic viscosity of each polyester, A2 was 0.70 dl/g, B was 0.72 dl/g, C was 0.80 dl/g and D was 1.15 dl/g. Each polyester was suitably made into chips.

Compositions of polyester raw material used in Examples and Comparative Examples and film compositions and production conditions of films in Examples and Comparative Examples are shown in Table 1 and Table 2, respectively.

TABLE 1

| | Raw material composition of polyester (mol %) | | | | | Added |
|---|---|---|---|---|---|---|
| | Dicarboxylic acid component | Polyhydric alcohol component | | | | mount of lubricant |
| | DMT | EG | NPG | CHDM | BD | (ppm) |
| Polyester A | 100 | 100 | — | — | — | 8000 |
| Polyester A2 | 100 | 100 | — | — | — | 0 |
| Polyester B | 100 | 70 | 30 | — | — | 0 |
| Polyester C | 100 | 70 | — | 30 | — | 0 |
| Polyester D | 100 | — | — | — | 100 | 0 |

TABLE 2

| | Resin composition | Amount of amorphous composition (mol %) | Tg of raw material (° C.) | Lengthwise drawing Drawing condition | | After lengthwise drawing Temperature of furnace (° C.) | Relaxation process in the longitudinal direction | | Intermediate heat treatment process | |
|---|---|---|---|---|---|---|---|---|---|---|
| | | | | | | | Relaxation Rate (%) | Relaxation rate of intermediate heat treatment process (%) | Relaxation rate of final heat treatment process (%) | Temperature (° C.) | Time (sec) |
| | | | | Temperature (° C.) | Ratio | | | | | | |
| Example. 1 | A/A2/B/D = 5:5:80:10 | 24 | 67 | 78 | 4 | 95 | 20 | 0 | 12.5 | 140 | 5 |
| Example. 2 | A/A2/C/D = 5:5:80:10 | 24 | 67 | 78 | 4 | 95 | 20 | 0 | 12.5 | 140 | 5 |
| Example. 3 | A/A2/B/D = 5:5:80:10 | 24 | 67 | 78 | 4 | 105 | 40 | 0 | 8 | 140 | 5 |
| Example. 4 | A/A2/B/D = 5:5:80:10 | 24 | 67 | 78 | 4 | 95 | 20 | 12.5 | 0 | 140 | 5 |
| Example. 5 | A/A2/B/D = 5:5:80:10 | 24 | 67 | 78 | 4 | 95 | 10 | 15 | 15 | 140 | 5 |
| Example. 6 | A/A2/B/D = 5:5:80:10 | 24 | 67 | 78 | 3.5 | 30 | 0 | 20 | 12.5 | 150 | 5 |
| Example. 7 | A/A2/B/D = 5:25:60:10 | 18 | 67 | 78 | 4 | 95 | 20 | 0 | 12.5 | 145 | 5 |
| Example. 8 | A/A2/B/D = 5:5:80:10 | 24 | 67 | 78 | 3.5 | 95 | 20 | 0 | 12.5 | 140 | 5 |
| Comparative Example 1 | A/A2/B/D = 5:5:80:10 | 24 | 67 | Lengthwise drawing being not conducted | | | | | | 100 | 5 |
| Comparative Example 2 | A/A2/B/D = 5:5:80:10 | 24 | 67 | 78 | 4 | 95 | 15 | 0 | 0 | 150 | 5 |
| Comparative Example 3 | A/A2/B/D = 5:5:80:10 | 24 | 67 | 78 | 4 | 110 | 60 | 0 | 0 | 125 | 5 |
| Comparative Example 4 | A/A2/B/D = 5:5:80:10 | 24 | 67 | 78/95 | 3.64 | 100 | 20 | 0 | 0 | 140 | 5 |
| Comparative Example 5 | A/A2/B/D = 5:5:80:10 | 24 | 67 | 78 | 4 | 95 | 20 | 0 | 0 | 140 | 5 |

| | Transverse drawing process | | | | |
|---|---|---|---|---|---|
| | Presence or absence of intermediate zone | Temperature of cooling process (° C.) | Temperature (° C.) | Ratio | Temperature of final heat treatment (° C.) |
| Example. 1 | Presence | 100 | 95 | 4 | 98 |
| Example. 2 | Presence | 100 | 95 | 4 | 98 |

TABLE 2-continued

| | | | | | |
|---|---|---|---|---|---|
| Example. 3 | Presence | 100 | 95 | 4 | 98 |
| Example. 4 | Presence | 100 | 95 | 4 | 98 |
| Example. 5 | Presence | 100 | 95 | 4 | 98 |
| Example. 6 | Presence | 100 | 95 | 4 | 98 |
| Example. 7 | Presence | 100 | 95 | 4 | 98 |
| Example. 8 | Presence | 100 | 95 | 4.5 | 98 |
| Comparative Example 1 | Presence | 100 | 70 | 4 | 80 |
| Comparative Example 2 | Presence | 100 | 95 | 4 | 98 |
| Comparative Example 3 | Presence | 100 | 95 | 4 | 98 |
| Comparative Example 4 | Presence | 100 | 95 | 4 | 85 |
| Comparative Example 5 | Presence | 100 | 95 | 4 | 98 |

Example 1

The above-described polyester A, polyester A2, polyester B and polyester D were mixed by 5:5:80:10 in mass ratio, and charged into an extruder. Thereafter, the mixed resin was melted at 280° C. and extruded from a T-die, and quenched by winding it on a rotating metal roll set at a surface temperature of 30° C. An undrawn film of 224 µm thickness was obtained. The taking-up speed of the undrawn film (rotary speed of metal roll) was about 20 m/min. Tg of the undrawn film was 67° C.

Then, the thus obtained undrawn film was introduced to a lengthwise drawing machine in which a plurality of rolls were continuously disposed, and drawn 4 times in the lengthwise direction by utilizing the difference of rotary speed of rolls.

The film immediately after the lengthwise drawing was passed through a heating furnace. The inside of the heating furnace was heated by means of a hot-air heater, and the preset temperature was set to 95° C. By taking advantage of the speed difference between a roll at the inlet side and a roll at the outlet side of the heating furnace, the film was allowed to relax by 20% in the longitudinal direction and subjected to an annealing treatment. The time for relaxation was set to 0.6 seconds.

The film after annealing was introduced to a transverse drawing machine (tenter), and continuously passed through an intermediate heat treatment zone, an intermediate zone (natural cooling zone), a cooling zone (forced cooling zone), a transverse drawing zone and a final heat treatment zone. In the intermediate zone in the tenter, hot wind from the intermediate heat treatment zone and cooling wind from the cooling zone were shut off such that when a rectangular strip of paper is hung down in the vertical direction in a state that a film is not passed through, the strip of paper hangs down almost completely in the vertical direction. In addition, when a film passes through, the distance of the film and the shielding plate was adjusted such that the most part of associated air accompanied by movement of the film was shut off by the shielding plate provided between the intermediate heat treatment zone and the intermediate zone. In addition, when a film passes through, in the boundary between the intermediate zone and the cooling zone, the distance of the film and the shielding plate was adjusted such that the most part of associated air accompanied by movement of the film was shut off by the shielding plate.

Then, the film after the relaxation introduced to the tenter was heat-treated in the intermediate heat treatment zone at a temperature of 140° C. for 5 seconds. Then the film after the intermediate heat treatment was introduced to the intermediate zone, and subjected to natural cooling by passing it through the zone (passing time=about 1.0 second). Thereafter, the film after the natural cooling was introduced to the cooling zone, and actively cooled by blowing wind of low temperature until the surface temperature of the film became 100° C., the film after the cooling was introduced to the second intermediate zone, and subjected to natural cooling again by passing it through the zone (passing time=about 1.0 second). Further, the film was drawn 4.0 times in the width direction (transverse direction) at 95° C.

Figure 2:
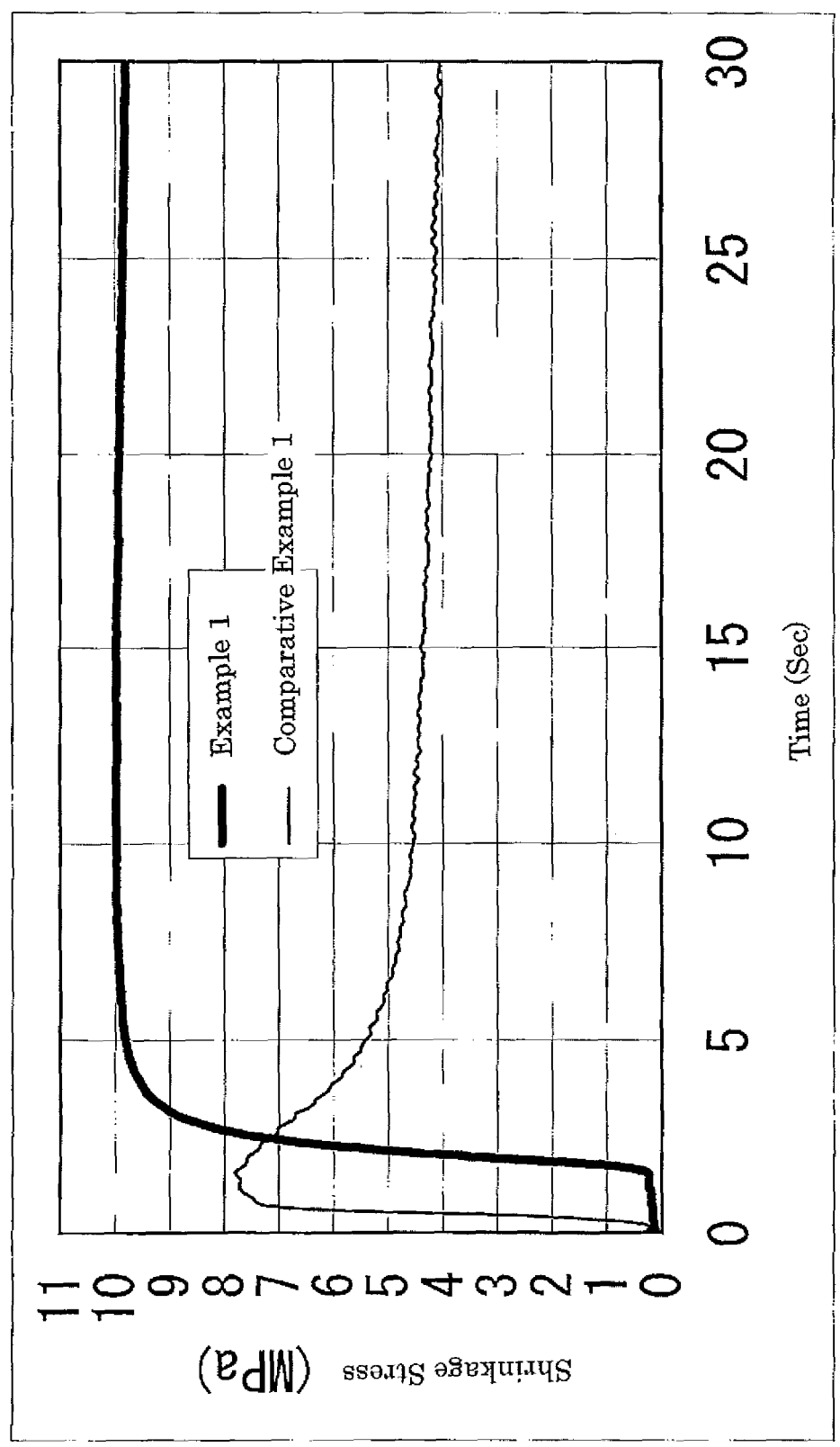
FIG. 2 shows shrinkage stress curves of the films in Example 1 and Comparative Example 1.

The film after transverse drawing was introduced into a final heat treatment zone, and subjected to a heat treatment at 98° C. over a period of 5 seconds in the final heat treatment zone. Simultaneously, the film was subjected to 15% relaxation in the longitudinal direction. Afterward, the film was cooled, both edge parts thereof were cut away, and the film of 500 mm in width was wound into a roll to continuously produce a biaxially drawn film with a thickness of 20 µm of a prescribed length. The resulting film was evaluated for various properties in the above-mentioned manner. The evaluation results are shown in Table 3. The film was satisfactory in cutting property and shrinkage finish properties. Moreover, the shrinkage stress curve was shown in FIG. 2.

Example 2

A film with a thickness of 20 µm was produced in the same manner as in Example 1 except that polyester B was changed polyester C. Tg of the undrawn film was 67° C. The evaluation results are shown in Table 3. The film was satisfactory in cutting property and shrinkage finish properties.

Example 3

A film with a thickness of 20 µm was produced in the same manner as in Example 1 except that the thickness of the undrawn film was set to 176 µm, the temperature of the heating furnace used after lengthwise drawing was changed to 105° C., the film was subjected to 40% relaxation in the longitudinal direction, and the relaxation rate was changed to 8% in the final heat treatment zone. The evaluation results are shown in Table 3. The film was satisfactory in cutting property and shrinkage finish properties.

Example 4

A film with a thickness of 20 µm was produced in the same manner as in Example 1 except that the thickness of the undrawn film was set to 224 µm, the film was subjected to 12.5% relaxation in the longitudinal direction in the intermediate heat treatment zone, and the relaxation was not performed in the final heat treatment zone. The evaluation results are shown in Table 3. The film was satisfactory in cutting property and shrinkage finish properties.

Example 5

A film with a thickness of 20 μm was produced in the same manner as in Example 1 except that the thickness of the undrawn film was set to 208 μm, the relaxation rate was changed to 10% in the heating furnace used after lengthwise drawing, the film was subjected to 15% relaxation in the intermediate heat treatment zone, and was subjected to 15% relaxation in the final heat treatment zone. The evaluation results are shown in Table 3. The film was satisfactory in cutting property and shrinkage finish properties.

Example 6

A film with a thickness of 20 μm was produced in the same manner as in Example 1 except that the thickness of the undrawn film was set to 224 μm, the drawing ratio of the lengthwise drawing was changed to 3.5 times, the temperature in the heating furnace used after lengthwise drawing was changed to 30° C., the film was not subjected to relaxation in the heating furnace, the temperature in the intermediate heat treatment zone was changed to 150° C., and the film was subjected to 20% relaxation in the longitudinal direction. The evaluation results are shown in Table 3. The film was satisfactory in cutting property and shrinkage finish properties.

Example 7

A film with a thickness of 20 μm was produced in the same manner as in Example 1 except that the mass ratio of polyester A, polyester A2, polyester B and polyester D was changed to 5:25:60:10, and the temperature of the intermediate heat treatment zone was changed to 145° C. The evaluation results are shown in Table 3. The film was satisfactory in cutting property and shrinkage finish properties.

Example 8

A film with a thickness of 20 μm was produced in the same manner as in Example 1 except that the thickness of the undrawn film was set to 221 μm, the drawing ratio of the lengthwise drawing was changed to 3.5 times, and the drawing ratio of the transverse drawing was changed to 4.5 times. The evaluation results are shown in Table 3. The film was satisfactory in cutting properties and shrinkage finish properties.

Comparative Example 1

A film with a thickness of 20 μm was produced in the same manner as in Example 1 except that the thickness of the undrawn film was set to 80 μm, the lengthwise drawing and the relaxation in the longitudinal direction were not performed, and the temperature of the intermediate heat treatment zone, the transverse drawing temperature and the final heat treatment temperature were changed to 100° C., 70° C. and 80° C., respectively. The evaluation results are shown in Table 3. The film had a large difference between shrinkages, and was a film in which the shrinkage finish properties were inferior to those in Examples. Moreover, the film had a small stress ratio, and was a film in which the difference between the maximum shrinkage stress and a shrinkage stress at the end of 30 seconds was large (see FIG. 2). For this reason, the label adhesiveness was inferior to those in Examples. On the other hand, since the right-angled tearing strength in the longitudinal direction was high, the perforation cutting property was also inferior to those in Examples.

Comparative Example 2

A film with a thickness of 20 μm was produced in the same manner as in Example 1 except that the thickness of the undrawn film was set to 231 μm, the relaxation rate was 15% in the heating furnace used after the lengthwise drawing, the temperature in the intermediate heat treatment zone was changed to 150° C., and the relaxation in the final heat treatment zone was not performed. The evaluation results are shown in Table 3. The film had a large difference between shrinkages and a large shrinkage strain of label, allowed three wrinkles to be generated at the upper part of the bottle, and was a film in which the shrinkage finish properties were inferior to those in Examples.

Comparative Example 3

A film with a thickness of 20 μm was produced in the same manner as in Example 1 except that the thickness of the undrawn film was set to 128 μm, the temperature of the heating furnace used after lengthwise drawing was changed to 110° C., the relaxation rate was changed to 60% in the longitudinal direction, the temperature of the intermediate heat treatment zone, and the relaxation in the final heat treatment zone was not performed. The evaluation results are shown in Table 3. The tensile breaking strength in the longitudinal direction was low, the right-angled tearing strength was high, and the perforation cutting property was also inferior to those in Examples. Moreover, the film had a small stress ratio, and was a film in which the difference between the maximum shrinkage stress and a shrinkage stress at the end of 30 seconds was large. For this reason, the label adhesiveness was inferior to those in Examples.

Comparative Example 4

An undrawn film with a thickness of 233 μm was obtained, after which the film was drawn by two stages in the lengthwise direction by taking advantage of the rotating speed difference of the rolls. That is, the undrawn film was preheated until the film temperature reached 78° C. on a preheat roll, after which the film was drawn by 2.6 times by taking advantage of the rotating speed difference between a low-speed rotating roll in which the surface temperature was set to 78° C. and a medium-speed rotating roll in which the surface temperature was set to 78° C. (the first lengthwise drawing stage). Furthermore, the film after lengthwise drawing was drawn in the lengthwise direction by 1.4 times by taking advantage of the rotating speed difference between a medium-speed rotating roll in which the surface temperature was set to 95° C. and a high-speed rotating roll in which the surface temperature was set to 30° C. (the second lengthwise drawing stage) (thus, the total lengthwise draw ratio is 3.64 times). The film immediately after lengthwise drawing was passed through a heating furnace and subjected to 20% relaxation in the longitudinal direction at 100° C. Thereafter, a film with a thickness of 20 μm was produced in the same manner as in Example 1 except that the temperature in the final heat treatment process was changed to 85° C. and the relaxation was not performed. The evaluation results are shown in Table 3. Although the film was satisfactory in cutting property and tensile breaking strength, the film had a large difference between shrinkages of 6%, allowed three wrinkles to be generated at the upper part of the bottle, and was a film inferior to those in Examples.

Comparative Example 5

A film with a thickness of 20 μm was produced in the same manner as in Example 1 except that the thickness of the undrawn film was set to 256 μm, and the relaxation in the final heat treatment zone was not performed. The evaluation results are shown in Table 3. The film had a large shrinkage strain of label, allowed five wrinkles to be generated at the upper part of the bottle, and was a film in which the shrinkage finish properties were inferior to those in Examples.

TABLE 3

| | Thickness (μm) | Absorvancy ratio | | Hot-water heat shrinkage (%) | | | | Difference between Shrinkages (%) | Transverse drawing process (MPa) | | Stress ratio (%) | Right-angled tearing strength (N/mm) |
| | | | | 90° C. | | | | | | | | |
| | | Longitudinal direction | Width direction | Longitudinal direction | Width direction | 70° C. Width direction | 80° C. Width direction | | Maximum stress | Stress after 30 seconds | | |
|---|---|---|---|---|---|---|---|---|---|---|---|---|
| Example. 1 | 20 | 0.58 | 0.81 | 6 | 50 | 17 | 33 | 1 | 10 | 9.8 | 98 | 250 |
| Example. 2 | 20 | 0.54 | 0.75 | 6 | 51 | 16 | 34 | 1 | 9.2 | 8.8 | 96 | 240 |
| Example. 3 | 20 | 0.45 | 0.71 | 4 | 54 | 17 | 36 | 1 | 8.1 | 6.9 | 86 | 300 |
| Example. 4 | 20 | 0.55 | 0.83 | 7.5 | 52 | 17 | 36 | 3 | 10.6 | 10 | 94 | 255 |
| Example. 5 | 20 | 0.52 | 0.75 | 6 | 53 | 16 | 35 | 1 | 9 | 8 | 89 | 275 |
| Example. 6 | 20 | 0.62 | 0.79 | 5 | 51 | 18 | 35 | 1 | 12 | 11.2 | 93 | 210 |
| Example. 7 | 20 | 0.68 | 0.90 | 8 | 47 | 19 | 35 | 4 | 12.5 | 11.8 | 94 | 200 |
| Example. 8 | 20 | 0.46 | 0.88 | 8 | 58 | 22 | 40 | 0 | 13.3 | 11.8 | 89 | 280 |
| Comparative Example 1 | 20 | 0.30 | 1.05 | 4 | 60 | 25 | 50 | 15 | 7.7 | 4 | 52 | 430 |
| Comparative Example 2 | 20 | 0.83 | 1.01 | 10 | 52 | 21 | 40 | 7 | 14.8 | 13.5 | 95 | 205 |
| Comparative Example 3 | 20 | 0.43 | 0.93 | 5 | 58 | 17 | 41 | 7 | 7 | 4.6 | 66 | 330 |
| Comparative Example 4 | 20 | 0.68 | 0.95 | 8 | 52 | 18 | 38 | 6 | 14.5 | 11 | 76 | 230 |
| Comparative Example 5 | 20 | 0.77 | 0.95 | 13 | 50 | 20 | 40 | 10 | 14.2 | 12 | 85 | 213 |

| | Tensile breaking strength (MPa) Longitudinal direction | Label adhesiveness | Shrinkage strain of label | Wrinkles of label | Perforation opening defective ratio (%) |
|---|---|---|---|---|---|
| Example. 1 | 170 | Excellent | Excellent | Excellent | 10 |
| Example. 2 | 165 | Excellent | Excellent | Excellent | 8 |
| Example. 3 | 125 | Excellent | Excellent | Excellent | 14 |
| Example. 4 | 160 | Excellent | Excellent | Good | 8 |
| Example. 5 | 150 | Excellent | Excellent | Excellent | 12 |
| Example. 6 | 190 | Excellent | Excellent | Excellent | 8 |
| Example. 7 | 200 | Excellent | Excellent | Good | 6 |
| Example. 8 | 130 | Excellent | Excellent | Excellent | 12 |
| Comparative Example 1 | 60 | Good | Good | Poor | 44 |
| Comparative Example 2 | 210 | Excellent | Good | Poor | 8 |
| Comparative Example 3 | 210 | Good | Good | Poor | 24 |
| Comparative Example 4 | 195 | Excellent | Good | Poor | 8 |
| Comparative Example 5 | 203 | Excellent | Poor | Poor | 8 |

INDUSTRIAL APPLICABILITY

The heat-shrinkable polyester film of the present invention has excellent properties as describe above, thus it can be used suitably as a label application for bottles. The package be attached the label using the heat-shrinkable polyester film of the present invention as a label, shows a good appearance.

The invention claimed is:

1. A heat-shrinkable polyester film, having a ratio A1/A2 of an absorbancy A1 at 1340 cm$^{-1}$ to an absorbancy A2 at 1410 cm$^{-1}$ obtained when measured by a polarized ATR-FTIR method of not less than 0.65 and not more than 0.9 in the main shrinkage direction of the film and of not less than 0.45 and not more than 0.75 in the direction orthogonal to the main shrinkage direction, and a hot-water heat shrinkage obtained when immersed in hot water at 90° C. for 10 seconds of not less than 40% and not more than 60% in the main shrinkage direction of the film and of not less than 0% and not more than 12% in the direction orthogonal to the main shrinkage direction.

2. The heat-shrinkable polyester film according to claim 1, having a maximum shrinkage stress in the main shrinkage direction of the film obtained when measured with hot air at 90° C. of not less than 7 MPa and not more than 14 MPa, and a shrinkage stress at the end of 30 seconds after the initiation of measurement of not less than 60% and not more than 100% of the maximum shrinkage stress.

3. The heat-shrinkable polyester film according to claim 2, having an absolute value $|\Delta_{90-80} - \Delta_{80-70}|$ of the difference between a difference $\Delta_{90-80}$ between a hot-water shrinkage at 90° C. and a hot-water shrinkage at 80° C. and a difference $\Delta_{80-70}$ between a hot-water shrinkage at 80° C. and a hot-water shrinkage at 70° C. obtained when immersed in hot water at each of the temperatures of 90° C., 80° C. and 70° C. for 10 seconds and measured in the main shrinkage direction of not more than 5%.

4. The heat-shrinkable polyester film according to claim 3 having a right-angled tearing strength per unit thickness in the direction orthogonal to the main shrinkage direction after being shrunk by 10% in the main shrinkage direction in hot water at 80° C. of not less than 180 N/mm and not more than 310 N/mm.

5. The heat-shrinkable polyester film according to claim 4, having a tensile breaking strength in the direction orthogonal to the main shrinkage direction of not less than 90 MPa and not more than 220 MPa.

6. A package comprising a label prepared from the heat-shrinkable polyester film according to claim 5 and provided with a perforation or a notch, the label being formed by being allowed to cover at least a part of the outer periphery of an object to be packaged and then to shrink by heat.

7. The heat-shrinkable polyester film according to claim 2 having a right-angled tearing strength per unit thickness in the direction orthogonal to the main shrinkage direction after being shrunk by 10% in the main shrinkage direction in hot water at 80° C. of not less than 180 N/mm and not more than 310 N/mm.

8. The heat-shrinkable polyester film according to claim 7, having a tensile breaking strength in the direction orthogonal to the main shrinkage direction of not less than 90 MPa and not more than 220 MPa.

9. A package comprising a label prepared from the heat-shrinkable polyester film according to claim 8 and provided with a perforation or a notch, the label being formed by being allowed to cover at least a part of the outer periphery of an object to be packaged and then to shrink by heat.

10. The heat-shrinkable polyester film according to claim 2, having a tensile breaking strength in the direction orthogonal to the main shrinkage direction of not less than 90 MPa and not more than 220 MPa.

11. A package comprising a label prepared from the heat-shrinkable polyester film according to claim 10 and provided with a perforation or a notch, the label being formed by being allowed to cover at least a part of the outer periphery of an object to be packaged and then to shrink by heat.

12. The heat-shrinkable polyester film according to claim 1, having an absolute value $|\Delta_{90-80}-\Delta_{80-70}|$ of the difference between a difference $\Delta_{90-80}$ between a hot-water shrinkage at 90° C. and a hot-water shrinkage at 80° C. and a difference $\Delta_{80-70}$ between a hot-water shrinkage at 80° C. and a hot-water shrinkage at 70° C. obtained when immersed in hot water at each of the temperatures of 90° C., 80° C. and 70° C. for 10 seconds and measured in the main shrinkage direction of not more than 5%.

13. The heat-shrinkable polyester film according to claim 12 having a right-angled tearing strength per unit thickness in the direction orthogonal to the main shrinkage direction after being shrunk by 10% in the main shrinkage direction in hot water at 80° C. of not less than 180 N/mm and not more than 310 N/mm.

14. The heat-shrinkable polyester film according to claim 13, having a tensile breaking strength in the direction orthogonal to the main shrinkage direction of not less than 90 MPa and not more than 220 MPa.

15. A package comprising a label prepared from the heat-shrinkable polyester film according to claim 14 and provided with a perforation or a notch, the label being formed by being allowed to cover at least a part of the outer periphery of an object to be packaged and then to shrink by heat.

16. The heat-shrinkable polyester film according to claim 12, having a tensile breaking strength in the direction orthogonal to the main shrinkage direction of not less than 90 MPa and not more than 220 MPa.

17. A package comprising a label prepared from the heat-shrinkable polyester film according to claim 16 and provided with a perforation or a notch, the label being formed by being allowed to cover at least a part of the outer periphery of an object to be packaged and then to shrink by heat.

18. The heat-shrinkable polyester film according to claim 1, having a right-angled tearing strength per unit thickness in the direction orthogonal to the main shrinkage direction after being shrunk by 10% in the main shrinkage direction in hot water at 80° C. of not less than 180 N/mm and not more than 310 N/mm.

19. The heat-shrinkable polyester film according to claim 1, having a tensile breaking strength in the direction orthogonal to the main shrinkage direction of not less than 90 MPa and not more than 220 MPa.

20. A package comprising a label prepared from the heat-shrinkable polyester film according to claim 1 and provided with a perforation or a notch, the label being formed by being allowed to cover at least a part of the outer periphery of an object to be packaged and then to shrink by heat.

\* \* \* \* \*